Patented Jan. 19, 1954

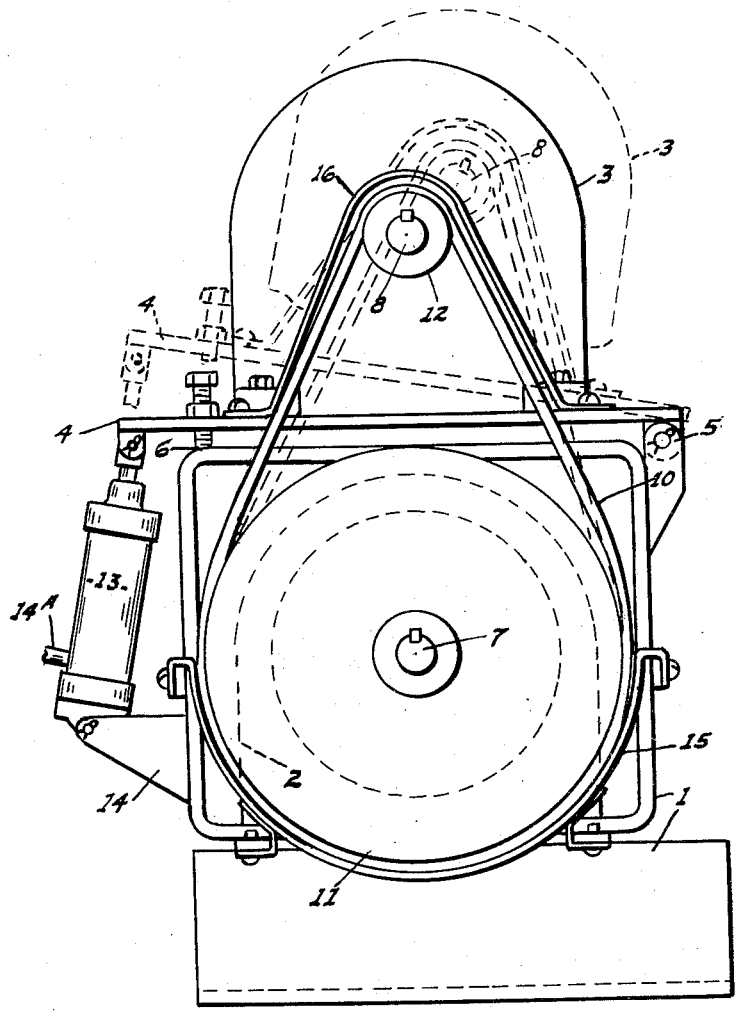

2,666,863

UNITED STATES PATENT OFFICE 2,666,863

TWO ELECTRIC MOTOR POWER UNIT

Ernest Davis and Russell D. McCallum, Syracuse, N. Y., assignors to The Prosperity Company, Inc., Syracuse, N. Y., a corporation of New York Application March 8, 1951, Serial No. 214,483

4 Claims. (Cl. 310—112)

This invention relates to power units including two alternately energizable electric motors in which the power is delivered directly through the shaft of one motor when that motor only is energized, and indirectly through the shaft of that motor, as an idler, when the other or second motor only is energized, and has for its object an extremely simple and compact arrangement of the motors in a unitary assembly and without the use of mechanism including clutches which transmit the power from the shaft of the second motor when the shaft of the first motor is acting as an idler.

The invention is particularly for actuating the receptacle or drum of a commercial laundry washing machine at high extracting speed of one motor, and at low washing speed of a second motor.

The invention consists in the novel features and in the combinations and constructions hereinafter set forth and claimed.

In describing this invention, reference is had to the accompanying drawings in which like characters designate corresponding parts in all the views.

Figure 2 is an end elevation looking to the left in Figure 1.

Figure 1:
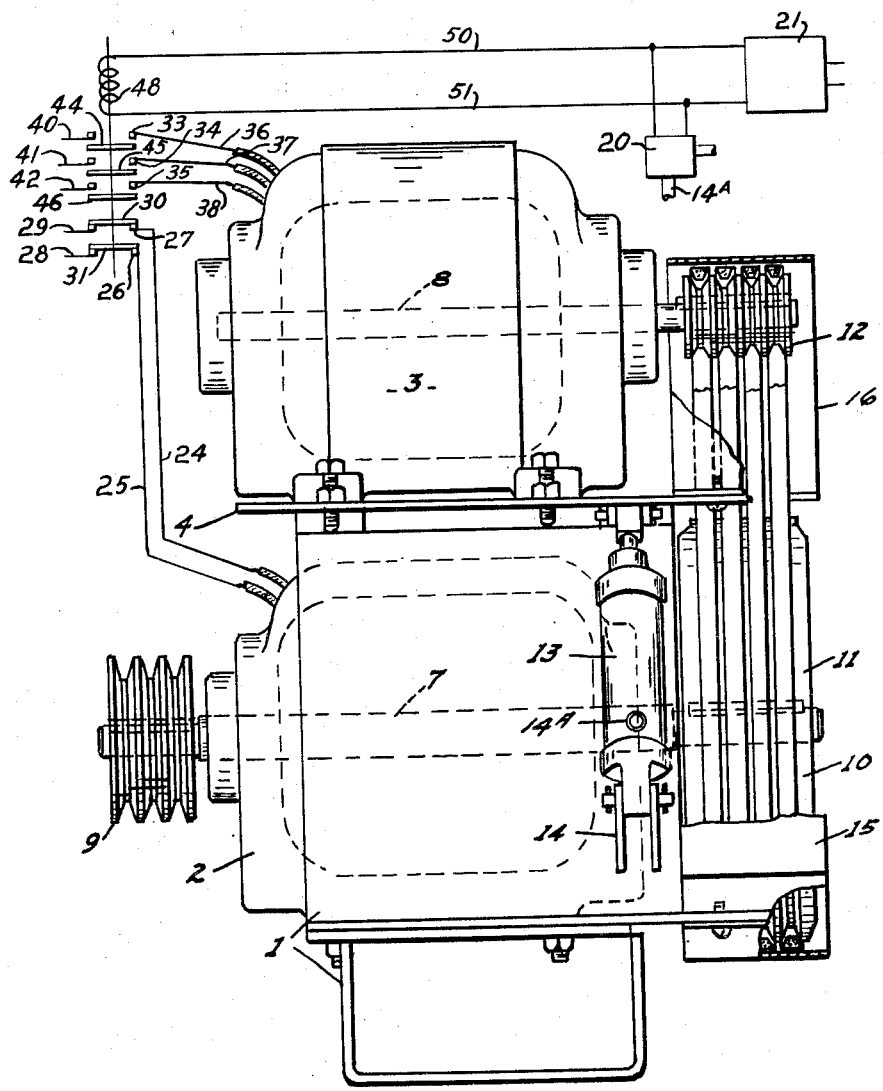
Figure 1 is a side elevation of the unit, including a schematic wiring diagram of the control circuit.

This power unit comprises a frame, high speed and low speed electric motors, the high speed motor being rigid with the frame, the rotating shafts of the motors being parallel, the shaft of the high speed motor having output motion transmitting means to deliver the power of either motor to the driven element, as the drum of a washing machine, a shiftable carriage on the frame for the low speed motor to shift the low speed motor and its shaft toward and from the shaft of the high speed motor; belt means running over sheaves on the motor shafts and power means for shifting the carriage to tighten and loosen the belt means, whereby the low speed motor shaft drives the shaft of the high speed motor shaft as an idler when the low speed motor only is energized and the belt means is tightened, and the high speed motor only, when energized, drives its shaft when the low speed motor is deenergized and the belt means is loosened.

Commercial laundry washing machines are usually timed in their operation by a work cycle timer, and in a washing machine embodying this unit, the energization of the high and low speed motors and of the power means for shifting the low speed motor to tighten and loosen the belt means, are also controlled in their proper sequence by the timer.

The numeral 1 designates the frame; 2 the high speed motor, and 3 the low speed motor. The low speed or washer motor 3 is usually a reversible motor which during a washing cycle rotates a number of times in one direction, then reverses and rotates a number of times in the opposite direction, and then repeats, so that during a washing cycle the drum of the washing machine is "oscillated", as the operation is inaccurately called in shop parlance.

4 is the carriage for the motor 3, this being shown as pivoted or hinged at 5 to the frame above the motor 2 and normally resting at 6 on the frame.

7 and 8 designate the shafts or armatures of the motors 2, 3, respectively. These shafts are mounted in any well known manner in the usual bearings in the frames or casings of the motors.

9 is means as sheaves mounted on one end of the shaft 7 of the high speed motor by which the motion is transmitted to the point of use, as to the drum of the washing machine, through a belt, not shown.

10 are belt means running over sheaves 11, 12, on the motor shafts 7, 8, respectively. The belts are preferably V belts. The belts are loose when the high speed motor 2 is energized so that no motion is transmitted to the shaft 8 of the low speed motor 3, and are tight when the high speed motor 2 is deenergized and the low speed motor 3 energized, so that the motion is transmitted from the motor 8 to the shaft 7, and the shaft 7 is rotated as an idler when the motor 2 is deenergized and the motor 3 energized.

The carriage 4 is shifted by a cylinder and piston motor 13 carried by a bracket 14 on the frame 1, and acting on the carriage at the edge thereof remote from the pivot 5. The cylinder of the motor is connected by a pipe 14A to a suitable source of air under pressure having a solenoid operated valve 20 therein for controlling the flow of air to and the exhaust of air from the cylinder. The valve is controlled by the cycle timer 21 of the washing machine.

The cylinder and piston motor lifts the carriage 4 to tighten the belts 10, and when the control valve is operated by the timer to release the air pressure in the air motor 13, the carriage 4 drops by gravity under the weight of the motor 3 and loosens the belts 10. The belts 10 and sheaves 11, 12, are protected by suitable shields 15, 16.

Owing to the mounting of the low speed motor 3 and its carriage 4 on the frame 1, the motor 3 can shift to tighten and loosen the belts, and further owing to the carrying of the air motor also on the frame 1, the unit consisting of the frame 1, motors 2, 3 and carriage 4 for the motor 3, and the belts 10, the unit is simple, compact without using mechanical clutches and their operating means.

The motors 2, 3, are controlled by a relay 23. The leads 24, 25, of motor 2 are connected to stationary contacts 26, 27, of the relay and are connected respectively to the power supply 28, 29, through movable contacts 30, 31, of the relay. The relay is also provided with fixed contacts 33, 34 and 35, connected to the leads 36, 37 and 38 of the motor 3. These leads are connected to the power line 40, 41, 42, by movable relay contacts 44, 45 and 46. When the relay coil 48 is energized, the contacts 30, 31, 44, 45 and 46 are moved upwardly, moving the contacts 30, 31, out of engagement with the contacts 26, 27, and moving the contacts 44, 45, 46, into engagement with the contacts 33, 34, 35. The line 50—51 energizing relay coil 48 is connected through wires 52, 53, to the solenoid operated valve 20, and is energized simultaneously with the coil 48 to furnish fluid under pressure through pipe 14A to the cylinder 13. The line 50—51 is connected to and controlled by the work cycle timer 21.

What we claim is:

1. A two-speed power unit comprising a frame, a first electric motor rigidly mounted in the frame and having a given speed, a carriage movably mounted on the frame, a second motor having a speed different from said first motor mounted on said carriage with its shaft extending parallel to the shaft of said first motor, said carriage being shiftable on the frame to shift said second motor and its shaft toward and from the shaft of said first motor, the shafts of both motors having alined sheaves at like ends, a belt trained over said sheaves, the sheave mounted on the shaft of one of said motors being of larger diameter than the sheave mounted on the shaft of said other motor, and means operable to shift said carriage to tighten and loosen the belt.

2. A two-speed power unit comprising a frame, an electric motor rigidly mounted in the frame and having output motion transmitting means, a carriage movably mounted on the frame, a second motor mounted on said carriage with its shaft extending parallel to the shaft of said first motor, said carriage being shiftable on the frame to shift said second motor and its shaft toward and from the shaft of said first motor, the shafts of both motors having alined sheaves at like ends, a belt trained over said sheaves, the sheave mounted on the shaft of one of said motors being of larger diameter than the sheave mounted on the shaft of said other motor, and means operable to shift said carriage to tighten and loosen the belt and simultaneously shift the power supply from one motor to the other motor.

3. A two-speed power unit comprising a frame, an electric motor rigidly mounted in the frame and having output motion transmitting means, a carriage pivotally mounted on the frame above said motor, a second motor mounted on said carriage with its shaft extending parallel to the shaft of said first motor, the shafts of both motors having alined sheaves at like ends, a belt trained over said sheaves, the sheave mounted on the shaft of one of said motors being of larger diameter than the sheave mounted on the shaft of said other motor, said carriage being movable about its pivot to move said second motor and its shaft toward and from the shaft of said first motor to tighten and loosen said belt, and a piston and cylinder structure mounted on the frame and being operatively connected to said carriage to effect movement thereof about its pivot.

4. A two-speed power unit comprising a frame, an electric motor rigidly mounted in the frame and having output motion transmitting means, a carriage pivotally mounted on the frame above said motor, a second motor mounted on said carriage with its shaft extending parallel to the shaft of said first motor, the shafts of both motors having alined pulleys at like ends, a belt trained over said pulleys, the pulley mounted on said second motor being of less diameter than the pulley mounted on the shaft of said first motor, said carriage being movable about its pivot to move said second motor and its shaft toward and from the shaft of said first motor to tighten and loosen said belt, a piston and cylinder structure connected to said carriage and being operable when supplied with fluid to effect movement of the carriage about its pivot in a direction from said first motor to tighten the belt, and means operable to deenergize said first motor, supply fluid to said cylinder and piston structure, and energize said second motor.

ERNEST DAVIS.
RUSSELL D. McCALLUM.

References Cited in the file of this patent

UNITED STATES PATENTS

| Number | Name | Date |
|---|---|---|
| 2,356,590 | Jacobsen | Aug. 22, 1944 |

FOREIGN PATENTS

| Number | Country | Date |
|---|---|---|
| 887,562 | France | Aug. 16, 1943 |